UNITED STATES PATENT OFFICE.

JOSEPH FLACHSLAENDER AND KARL PAUL GRÄLERT, OF ELBERFELD, AND MAX BUFF, OF VOHWINKEL, NEAR ELBERFELD, GERMANY, ASSIGNORS TO FARBENFABRIKEN VORM. FRIEDR. BAYER & CO., OF ELBERFELD, GERMANY, A CORPORATION OF GERMANY.

CATECHU-BROWN SULFUR DYE.

1,081,601.
No Drawing.

Specification of Letters Patent. Patented Dec. 16, 1913.

Application filed October 10, 1912. Serial No. 725,029.

*To all whom it may concern:*

Be it known that we, JOSEPH FLACHSLAENDER and KARL PAUL GRÄLERT, residing at Elberfeld, and MAX BUFF, residing at Vohwinkel, near Elberfeld, Germany, doctors of philosophy, chemists, citizens of the German Empire, have invented new and useful Improvements in New Catechu-Brown Sulfur Dye, of which the following is a specification.

Our invention relates to the manufacture and production of new and valuable brown sulfur colors which are obtained by treating with alkali polysulfids pyrimidin compounds containing the radical:

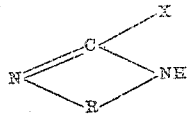

with a free bond shown in place X (in which R stands for a naphthalene ring containing at least one nitro group). The reaction can also be carried out with the addition of copper or a copper compound.

The new dyes are after being dried and pulverized dark powders soluble in a solution of sodium sulfid generally with a redbrown coloration and scarcely soluble in concentrated sulfuric acid with a yellowish-brown coloration. They dye cotton in catechu-brown shades distinguished by their fastness to light.

In order to illustrate the new process more fully the following example is given, the parts being by weight:—250 parts of crystallized sodium sulfid, 55 parts of sulfur, 7 parts of CuSO₄, 25.8 parts of dinitropyrimidin having most probably the following formula:

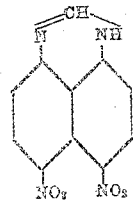

and a small quantity of water are heated until dry, the temperature being gradually raised and the heating is then continued for 6 to 8 hours at from 200°–250° C. The melt is powdered and then ready for use. The dyestuff is a dark powder soluble in a sodium sulfid solution with a reddish-brown coloration. It is scarcely soluble in concentrated sulfuric acid with a yellowish-brown coloration and dyes cotton in pure catechu-brown shades fast to light.

The above mentioned quantities of sodium sulfid and of sulfur as well as the temperatures and the duration of the reaction can be varied within wide limits.

Similar dyestuffs are obtained by using other of the above mentioned products, such as mononitropyrimidin, nitromethylpyrimidin, etc.

We claim:

1. The herein described new sulfur dyes being sulfur-containing derivatives of pyrimidin compounds containing the radical:

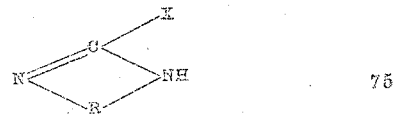

with a free bond shown in place X, in which R stands for a naphthalene ring containing at least one nitro group, which dyes are after being dried and pulverized dark powders being soluble in a solution of sodium sulfid generally with a red-brown coloration; being scarcely soluble in concentrated sulfuric acid with a yellowish-brown coloration; dyeing unmordanted cotton catechu-brown shades fast to light, substantially as described.

2. The herein described new sulfur dye being a sulfur-containing derivative of dinitropyrimidin having most probably the formula:

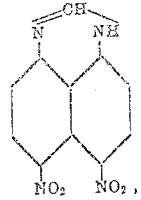

which is after being dried and pulverized a dark powder soluble in a sodium sulfid solution with a reddish-brown coloration and scarcely soluble in concentrated sulfuric acid with a yellowish-brown coloration; dyeing unmordanted cotton in pure catechu-brown shades fast to light, substantially as described.

In testimony whereof we have hereunto set our hands in the presence of two subscribing witnesses.

JOSEPH FLACHSLAENDER. [L. S.]
KARL PAUL GRÄLERT. [L. S.]
MAX BUFF. [L. S.]

Witnesses:
HELEN NUFER,
ALBERT NUFER.